United States Patent
Klammer et al.

(10) Patent No.: US 9,774,455 B2
(45) Date of Patent: *Sep. 26, 2017

(54) RFID SECURE AUTHENTICATION

(71) Applicant: COVIDIEN LP, Mansfield, MA (US)

(72) Inventors: Peter F. Klammer, Wheat Ridge, CO (US); William G. Paterson, Johnstown, CO (US)

(73) Assignee: COVIDIEN LP, Mansfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/341,244

(22) Filed: Nov. 2, 2016

(65) Prior Publication Data

US 2017/0078102 A1 Mar. 16, 2017

Related U.S. Application Data

(63) Continuation of application No. 14/189,259, filed on Feb. 25, 2014, now Pat. No. 9,489,785.

(Continued)

(51) Int. Cl.
*G06F 21/44* (2013.01)
*H04L 9/00* (2006.01)
(Continued)

(52) U.S. Cl.
CPC ............ *H04L 9/3247* (2013.01); *G06F 21/44* (2013.01); *G06F 21/82* (2013.01); *G06K 19/0723* (2013.01); *G07C 9/00111* (2013.01); *H04L 9/0863* (2013.01); *H04L 63/06* (2013.01); *H04L 63/083* (2013.01); *H04W 12/04* (2013.01);

(Continued)

(58) Field of Classification Search
None
See application file for complete search history.

(56) References Cited

U.S. PATENT DOCUMENTS

| 5,383,874 A | 1/1995 | Jackson et al. |
| 5,651,780 A | 7/1997 | Jackson et al. |

(Continued)

FOREIGN PATENT DOCUMENTS

| JP | 2002-269529 A | 9/2002 |
| JP | 2007-140778 A | 6/2007 |

(Continued)

OTHER PUBLICATIONS

International Search Report No. PCT/US2014/018626 dated May 29, 2014.

(Continued)

*Primary Examiner* — Joseph Feild
*Assistant Examiner* — John Mortell

(57) ABSTRACT

Authentication systems and methods for a population of devices each associated with an RFID tag are described. For each device, a secret key is combined cryptographically with a publicly-readable unique identifier (UID) of an RFID tag to obtain a unique authorization signature. The RFID tag is prepared utilizing the unique authorization signature as memory-access and/or tag-operation password(s). The systems and methods may safeguard against attacks whereby compromise of a single tag will not compromise the entire population of devices and may reduce or eliminate the use of inappropriate surgical devices during a surgical procedure.

20 Claims, 6 Drawing Sheets

Related U.S. Application Data

(60) Provisional application No. 61/784,276, filed on Mar. 14, 2013.

(51) Int. Cl.

| | | |
|---|---|---|
| *H04L 9/32* | (2006.01) | |
| *G07C 9/00* | (2006.01) | |
| *G06F 21/82* | (2013.01) | |
| *G06K 19/07* | (2006.01) | |
| *H04L 9/08* | (2006.01) | |
| *H04L 29/06* | (2006.01) | |
| *H04W 12/04* | (2009.01) | |
| *H04W 12/06* | (2009.01) | |
| *G06Q 10/08* | (2012.01) | |

(52) U.S. Cl.
CPC ............ *H04W 12/06* (2013.01); *G06Q 10/08* (2013.01); *H04L 2209/80* (2013.01)

(56) References Cited

U.S. PATENT DOCUMENTS

| | | | |
|---|---|---|---|
| 5,937,065 A * | 8/1999 | Simon | B60R 25/24 380/262 |
| 6,017,354 A | 1/2000 | Culp et al. | |
| 6,092,722 A | 7/2000 | Heinrichs et al. | |
| 6,237,604 B1 | 5/2001 | Burnside et al. | |
| 6,308,089 B1 | 10/2001 | von der Ruhr et al. | |
| 6,346,886 B1 | 2/2002 | De La Huerga | |
| 6,387,092 B1 | 5/2002 | Burnside et al. | |
| 6,454,162 B1 | 9/2002 | Teller | |
| 6,578,579 B2 | 6/2003 | Burnside et al. | |
| 6,611,793 B1 | 8/2003 | Burnside et al. | |
| 6,626,355 B2 | 9/2003 | Sasse et al. | |
| 6,651,669 B1 | 11/2003 | Burnside | |
| 6,733,495 B1 | 5/2004 | Bek et al. | |
| 6,783,523 B2 | 8/2004 | Qin et al. | |
| 6,792,390 B1 | 9/2004 | Burnside et al. | |
| 6,827,715 B2 | 12/2004 | Francischelli et al. | |
| 6,861,954 B2 | 3/2005 | Levin | |
| 6,899,538 B2 | 5/2005 | Matoba | |
| 6,908,472 B2 | 6/2005 | Wiener et al. | |
| 6,910,084 B2 | 6/2005 | Augustijn et al. | |
| 7,048,687 B1 | 5/2006 | Reuss et al. | |
| 7,118,564 B2 | 10/2006 | Ritchie et al. | |
| 7,158,030 B2 | 1/2007 | Chung | |
| 7,169,144 B2 | 1/2007 | Hoey et al. | |
| 7,176,030 B2 | 2/2007 | Faries, Jr. et al. | |
| 7,193,519 B2 | 3/2007 | Root et al. | |
| 7,214,224 B2 | 5/2007 | Goble | |
| 7,216,802 B1 | 5/2007 | De La Huerga | |
| 7,217,269 B2 | 5/2007 | El-Galley et al. | |
| 7,253,736 B2 | 8/2007 | Tethrake et al. | |
| 7,256,696 B2 | 8/2007 | Levin | |
| 7,258,546 B2 | 8/2007 | Beier et al. | |
| 7,258,688 B1 | 8/2007 | Shah et al. | |
| 7,289,139 B2 | 10/2007 | Amling et al. | |
| 7,300,436 B2 | 11/2007 | Penny et al. | |
| 7,420,468 B2 | 9/2008 | Fabian et al. | |
| 7,443,296 B2 | 10/2008 | Mezhinsky et al. | |
| 7,469,383 B2 | 12/2008 | Busch | |
| 7,517,351 B2 | 4/2009 | Culp et al. | |
| 7,551,077 B2 | 6/2009 | Raybuck et al. | |
| 7,559,483 B2 | 7/2009 | Hickle et al. | |
| 7,568,619 B2 | 8/2009 | Todd et al. | |
| 7,661,582 B2 | 2/2010 | Mollstam | |
| 7,664,658 B2 | 2/2010 | Harrison et al. | |
| 7,722,531 B1 | 5/2010 | Boche | |
| 7,743,975 B2 | 6/2010 | Miller | |
| 7,766,235 B2 | 8/2010 | Miller | |
| 7,796,040 B2 | 9/2010 | Mezhinsky et al. | |
| 7,835,823 B2 | 11/2010 | Sillman et al. | |
| 7,837,091 B2 | 11/2010 | Cook et al. | |
| 7,837,694 B2 | 11/2010 | Tethrake et al. | |
| 7,887,559 B2 | 2/2011 | Deng et al. | |
| 7,934,648 B2 | 5/2011 | Charles et al. | |
| 8,203,449 B2 | 6/2012 | Park et al. | |
| 8,257,346 B2 | 9/2012 | Qin et al. | |
| 2007/0244825 A1 | 10/2007 | Semmer et al. | |
| 2008/0297326 A1 | 12/2008 | Chakraborty et al. | |
| 2009/0096574 A1 | 4/2009 | Oberle | |
| 2009/0254077 A1 * | 10/2009 | Craig | A61B 18/1206 606/33 |
| 2009/0315686 A1 | 12/2009 | Oberle | |
| 2011/0098698 A1 | 4/2011 | Bek et al. | |
| 2012/0046659 A1 * | 2/2012 | Mueller | A61B 18/1445 606/41 |
| 2012/0283731 A1 * | 11/2012 | Unger | A61B 18/1206 606/49 |
| 2013/0207780 A1 * | 8/2013 | Poovendran | H04L 9/3236 340/10.1 |

FOREIGN PATENT DOCUMENTS

| | | |
|---|---|---|
| JP | 2008-514363 A | 5/2008 |
| JP | 2008-253464 A | 10/2008 |
| JP | 2009-081564 A | 4/2009 |
| JP | 2010-503295 A | 1/2010 |
| KR | 10-0862009 B1 | 10/2008 |
| WO | 2007-036901 A1 | 4/2007 |

OTHER PUBLICATIONS

Anonymous: "Is it okay to truncate a SHA256 hash to 128 bits?", Jun. 11, 2010; Retrieved from the Internet: URL: http://stackoverflow.com/questions/3026762/is-it-okay-to-truncate-a-sha256-hash-to-128-bits.

Extended European Search Report for corresponding European Patent Application No. 14773269.7-1853 / 2973163, dated Nov. 28, 2016 (9 pages).

Office Action issued by the State Intellectual Property Office of the People's Republic of China, corresponding to Chinese Patent Application No. 201480013912.0 dated Apr. 6, 2017 (10 pages) along with an English translation (6 pages).

Office Action issued by the Canadian Intellectual Property Office, corresponding to Canadian Patent Application No. 2,901,136, dated Dec. 13, 2016 (5 pages).

Examination Report issued by the Australian Government, IP Australia, corresponding to Australian Patent Application No. 2014242077, dated Jan. 13, 2017 (5 pages).

Office Action issued by the Japanese Patent Office, corresponding to Japanese Patent Application No. 2016-500408, dated Dec. 21, 2016 (5 pages) along with an English translation (7 pages).

* cited by examiner

RFID SECURE AUTHENTICATION

CROSS REFERENCE TO RELATED APPLICATION

The present application is a continuation of U.S. patent application Ser. No. 14/189,259, filed on Feb. 25, 2014, which claims the benefit of and priority to U.S. Provisional Application Ser. No. 61/784,276, filed on Mar. 14, 2013. The entire contents of all of the foregoing applications are incorporated by reference herein.

BACKGROUND

1. Technical Field

The present disclosure generally relates to radiofrequency identification technology, also known as RFID, and more particularly, to systems, apparatus, and related methods for the secure authentication of RFID tags that do not require the use of read-write memory of the tag.

2. Background of Related Art

RFID is a method for automatic identification which uses radiofrequency (RF) signals. A device known as an RFID interrogator wirelessly reads, and optionally, writes, data stored in a transponder known as an RFID tag that is physically attached to an article, such as a product, packaging, or shipping container. Typically, an RFID tag consists of two main components: an integrated circuit (IC) for storing and processing data and for modulating and demodulating the RF signal, and an antenna coupled to the chip that enables the chip to exchange data between the tag and interrogator. An RFID tag can be read-only, wherein the IC contains unalterable data, such as a unique identification code indelibly encoded by the tag manufacturer which is used to uniquely identify the tag. Alternatively, an RFID tag can be read-write, wherein the stored data can be changed or deleted. Typically, however, a read-write RFID tag will also contain read-only data, such as an indelible unique identification code, so that individual tags can be uniquely identified. Certain types or models of read-write RFID tags— herein called secure RFID tags—provide security or protection features or mechanisms, such that reading and/or writing of the tag is controlled and conditioned upon successful communication of one or more passwords. In these secure RFID tags, a password is stored in write-only storage; that is, a password can be set or changed by a write operation, but cannot be revealed by any read operation. In order for an interrogator to gain access to data in the secure RFID tag, any read or write operations must be preceded by a password operation, in which the tag compares the interrogator's offered password to the tag's stored password. The secure RFID tag normally indicates success or failure of password comparison in its response to the password operation. Successful matching of passwords will temporarily enable subsequent read or write operations, until the tag is reset, either deliberately by the interrogator (at the end of operations), or incidentally by loss of power when a passive tag is removed from the vicinity of the interrogator.

RFID tags are characterized as being active or passive. Active RFID tags contain a power source, such as a battery, whereas passive RFID tags are powered by energy derived from the RF interrogation signal. As a result, a passive RFID tag typically has relatively modest processing and memory capabilities. Generally, but not exclusively, active RFID tags are used in heavy industrial, municipal, and military applications, while passive RFID tags are used in smaller devices such as tools, electronic devices and components, credit/debit cards, and the like. Active RFID tags may offer increased range over passive style tags.

An RFID tag may be employed for a variety of purposes. One such purpose is to authenticate an accessory device (e.g., a surgical instrument) to determine whether the accessory or instrument device is suitable for use with a main device, (e.g., an electrosurgical or microwave generator). Authentication is prepared or provisioned by generating and storing—or "programming"—a secret piece of information in the tag which is attached or affixed to the accessory device. This secret, called an "authentication signature," is intended to be known or determinable only by the programmer of the RFID tag and by the manufacturer, vendor, or owner of the main and accessory devices to be authenticated. In subsequent usage intended to be protected by authentication, the authentication signature must be communicated between the interrogator and the secure RFID tag for comparison. It is assumed that these secure RFID tags cannot perform encryption or decryption, and therefore the authentication signature must be exposed by RF communication in plaintext during authentication events. Thus an adversary may attempt to discover authentication signatures with readily-available apparatus, such as RFID interrogators, and RF signal capture or recording devices ("sniffers").

If the authentication signature were a simple secret (key or password) shared in common by all instances of accessory devices within a population of devices, any discovery by an adversary—no matter by what means—of one authentication signature would break authentication for an unlimited number of accessory devices.

In prior art systems, the authentication signature is stored in a known location in read-write memory in the RFID tag. In these systems, a main device seeking to authenticate an accessory will read the UID from the RFID tag associated with the accessory, and perform an identical calculation using the same secret key as that which presumably was used to program the tag initially. The stored authentication signature is then read from the RFID tag of the accessory and compared to the calculated authentication signature. If a match is confirmed, the accessory is judged to be authentic.

Such prior-art systems have disadvantages because they require consumption of read-write memory which is a scarce resource in an RFID tag; and because RFID read-write memory, may be accessible by any party in possession of an easily obtainable RFID interrogator, and thus the authentication signature for a given RFID chip may be readily readable. Another disadvantage of such readability is that an adversary who can read some number of authentication signatures may be able to deduce or derive the pattern or rule of diversification for a large population of accessory devices, and thus defeat the authentication system.

SUMMARY

The present disclosure is directed to a secure RFID authentication system, apparatus, and related methods of use. In one novel aspect, memory areas of the RFID tag that are normally associated with password functions are adapted to store an authentication signature, thereby freeing read-write memory to be allocated for application usage. In some embodiments, an RFID tag includes password-controlled access to read and/or write functions. By storing the authentication signature as a read, write, read-write, or other password, the ability to read, write, or further operate or communicate with an RFID tag can be prevented and therefore, the use of devices associated with such tags may also be controlled more reliably and securely. For example, and without limitation, RFID tags in accordance with the present disclosure may be utilized to control interoperability of devices, to enable the use of authentic devices and/or accessories and to disallow the use of unauthorized devices and/or accessories, with greater certainty and reliability than with prior-art approaches that are vulnerable to attack and compromise.

Such a capability may have benefits, and for example, may reduce or eliminate the use of inappropriate surgical devices during a surgical procedure. Inappropriate surgical devices may include, without limitation, a surgical device that has been previously used, is unsterile, was procured through unauthorized distribution channels, is counterfeit, is untested, incompatible, uncalibrated, not approved, not subject to proper quality control, remanufactured, and the like.

In some embodiments, a method of authenticating an RFID tag includes selecting a secret key; preparing the RFID tag by reading a unique identification (UID) code from the RFID tag, creating a unique authentication signature by cryptographically combining the secret key with the UID, and setting a password or set of passwords of the RFID tag to the unique authentication signature; and authenticating the RFID tag by reading the unique identification (UID) code from the RFID tag, re-creating the unique authentication signature by cryptographically combining the secret key with the UID; attempting to access a function of the RFID tag by offering the unique authentication signature to the RFID tag as a password or set of passwords, and judging the RFID tag as authentic either if the RFID tag gave no error responses from the password operations, or if the attempt to access a password-controlled function of the RFID tag is successful. In embodiments, the function for which access is attempted may include, without limitation, a read function, a write function, and/or a privacy function.

In one aspect, embodiments in accordance with the present disclosure include devices, such as but not limited to surgical instruments, that can be operably attached to or associated with equipment, such as but not limited to electrosurgical generators, ultrasound generators, and microwave generators, which includes at least one of a radiofrequency identification (RFID) interrogator, or an RFID tag that has a permanent, unalterable, and unique identification number (UID), a read-write memory that can retain data until re-written, a protection mechanism that can selectively prevent reading or rewriting of selected portions of the read-write memory, and password storage that is operably coupled to the read-write protection mechanism and which can be written, but not read.

In one aspect, the systems in accordance with embodiments of the present disclosure utilize one or more RFID tags having a globally unique identification number (UID), read-write memory, and a password mechanism that is write-only and is itself password protected. The system includes one or more RFID interrogators (e.g., reader or authenticator) which are configured to power, read, and write RFID tags. At least one of the RFID interrogators is configured as an RFID programmer usable by an authorized agent to create a secure authentication RFID tag from an unprepared (e.g., factory-fresh or virgin) RFID tag. At least one of the RFID interrogators is configured as an RFID authenticator to query an RFID tag to determine whether it is a valid secure authentication RFID tag. The disclosed system includes a secret key known only to RFID programmers and RFID authenticators. In some embodiments, the secret key is expressed as a bitstring having a known length.

In another aspect, method and apparatus are described for producing and identifying one or more RFID tags for purposes of secure authentication, e.g., for enabling, allowing, or granting access upon presentation of correctly prepared RFID tags, while disabling and/or denying access to similar but incorrectly prepared or unprepared RFID tags, while preventing unauthorized copying, cloning, or counterfeiting of authentic RFID tags. Advantageously, the read-write memory capacity of an RFID tag is not reduced by preparing it with the secure authentication information because the secure authentication signature is stored as a write-only password and thus occupies no read-write memory of the RFID tag. An RFID programmer in possession of the secret key may prepare an authorized secure authentication RFID tags from a factory-fresh RFID tag by combining information that is unique per tag, i.e., the UID, with the predetermined secret key. An RFID authenticator in possession of the same secret key may validate an RFID tag to determine whether such tag is a secure authentication RFID tag which has been programmed with the authorized secret authentication key. In embodiments in accordance with the present disclosure, any RFID programmer without knowledge of the secret authentication key cannot feasibly create a secure authentication RFID tag. Similarly, an RFID reader without possession of the same secret key cannot feasibly confirm whether a given RFID tag has been prepared with the secret key, even though it may be able to recognize if an RFID tag is unprogrammed, unprepared with the secret authentication key, or programmed with some other key (secret or otherwise) of which the RFID authenticator is in possession. Any party in possession of some number of secure authentication RFID tags and blank or otherwise programmed RFID tags, but not in possession of the secret authentication key, cannot feasibly determine or extract the secret key. A party able to intercept RFID signals of the authentication events of a transaction (e.g., authentication) session with a secure authentication RFID tag, but not already knowing the secret key, cannot feasibly determine, derive, calculate, or extract the secret key. A party able to intercept the RFID signals from the events of a programming (e.g., preparation or manufacturing) session with a secure authentication RFID tag, but not in possession of the secret key, cannot feasibly determine, derive, calculate, or extract the secret key. A party with such prepared RFID tags or intercepted signals, but that is not in possession of the secret key, cannot feasibly clone, copy, counterfeit, or otherwise create secure authentication RFID tags from unprepared (e.g., factory-fresh or virgin) RFID tags. A party with such prepared RFID tags or intercepted signals, but that is not in possession of the secret key, cannot feasibly alter or disable the authentication information included within a secure authentication RFID tag.

In another aspect, embodiments of a method of authenticating an RFID tag are described, including selecting a secret key; preparing the RFID tag, wherein preparing the RFID tag includes reading a unique identification code from the RFID tag, creating an authentication signature from the secret key and the unique identification code, and setting a password of the RFID tag to the authentication signature; and authenticating the RFID tag, wherein authenticating the RFID tag includes reading the unique identification code from the RFID tag, re-creating the authentication signature from the secret key and the unique identification code, attempting to access a function of the RFID tag by providing the authentication signature to the RFID tag as the password, and determining that the RFID tag is authentic if the attempt to access a function of the RFID tag is successful. In some embodiments, the function for which access is attempted is a read function, a write function, a read-write function, or a privacy function.

In some embodiments, the methods in accordance with the present disclosure of authenticating an RFID tag include concatenating the unique identification code (UID) and the secret key to create a bitstring, and performing a cryptographically secure hash function (e.g., SHA-1, or SHA-1 HMAC) on the bitstring to obtain the authentication signature.

In some embodiments, methods in accordance with the present disclosure of authenticating an RFID tag include dividing the authentication signature into a plurality of bitstrings of equal length, performing XOR operations between the plurality of bitstrings to obtain a compressed or shortened result that is suitable to the number of password bits in the RFID tag.

In another aspect, a system for preparing a surgical instrument for use in an electrosurgical procedure is described. The system includes a surgical instrument having an RFID tag which includes a unique identifier readable by a preparation unit and a password module configured to store a password and to return a status indicating whether a proffered password is equal to the stored password; and a preparation unit having an RFID communication unit, a processor operably coupled to the RFID communication unit, and a memory operably coupled to the processor storing a secret key and having a set of instructions for reading the unique identifier of the RFID tag of the surgical instrument, generating an authentication signature based at least in part upon the secret key and the unique identifier of the RFID tag of the surgical instrument, and storing the authentication signature as a password in the password module. The password may be associated with a function of the RFID tag. The function may be read-enabling the read-write memory, write-enabling the read-write memory, or read-write-enabling the read-write memory.

In some embodiments, the RFID tag further includes a read-write memory and the set of instructions further includes instructions configured to initialize a data structure within the read-write memory. In some embodiments, the data structure is configured to store a usage count, a manufacturing date, a manufacturer serial number, an expiration date, calibration data, historical data, certification data, or operational limit parameters.

In some embodiments, the presently described system generates the authentication signature at least in part using a cryptographic hash of the secret key and the unique identifier (UID) of the RFID tag.

In another aspect, a system for authenticating a surgical instrument for use during an electrosurgical procedure is described. In some embodiments, the system includes a surgical instrument having an RFID tag, wherein the RFID tag includes a unique identifier readable by an authentication unit and a password module storing a password and configured to return a status indicating whether a proffered password is equal to the stored password. The system further includes an authentication unit having an RFID communication unit, a processor operably coupled to the RFID communication unit, and a memory operably coupled to the processor storing a secret key and having a set of instructions for reading the unique identifier of the RFID tag of the surgical instrument, generating an authentication signature based at least in part upon the secret key and the unique identifier of the RFID tag of the surgical instrument, proffering the authentication signature as a password to the password module, and receiving a status indicating whether the proffered password is equal to the stored password. In some embodiments, the system includes an electrosurgical generator operably coupled to the processor. In some embodiments, operation of the electrosurgical generator is inhibited if the received status indicates the proffered password does not is equal the stored password. In some embodiments, the RFID tag includes a read-write memory, and the set of instructions further includes instructions configured to modify data within the read-write memory. In some embodiments, the authentication signature is generated at least in part upon a cryptographic hash of the secret key and the unique identifier of the RFID tag.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Figure 1:
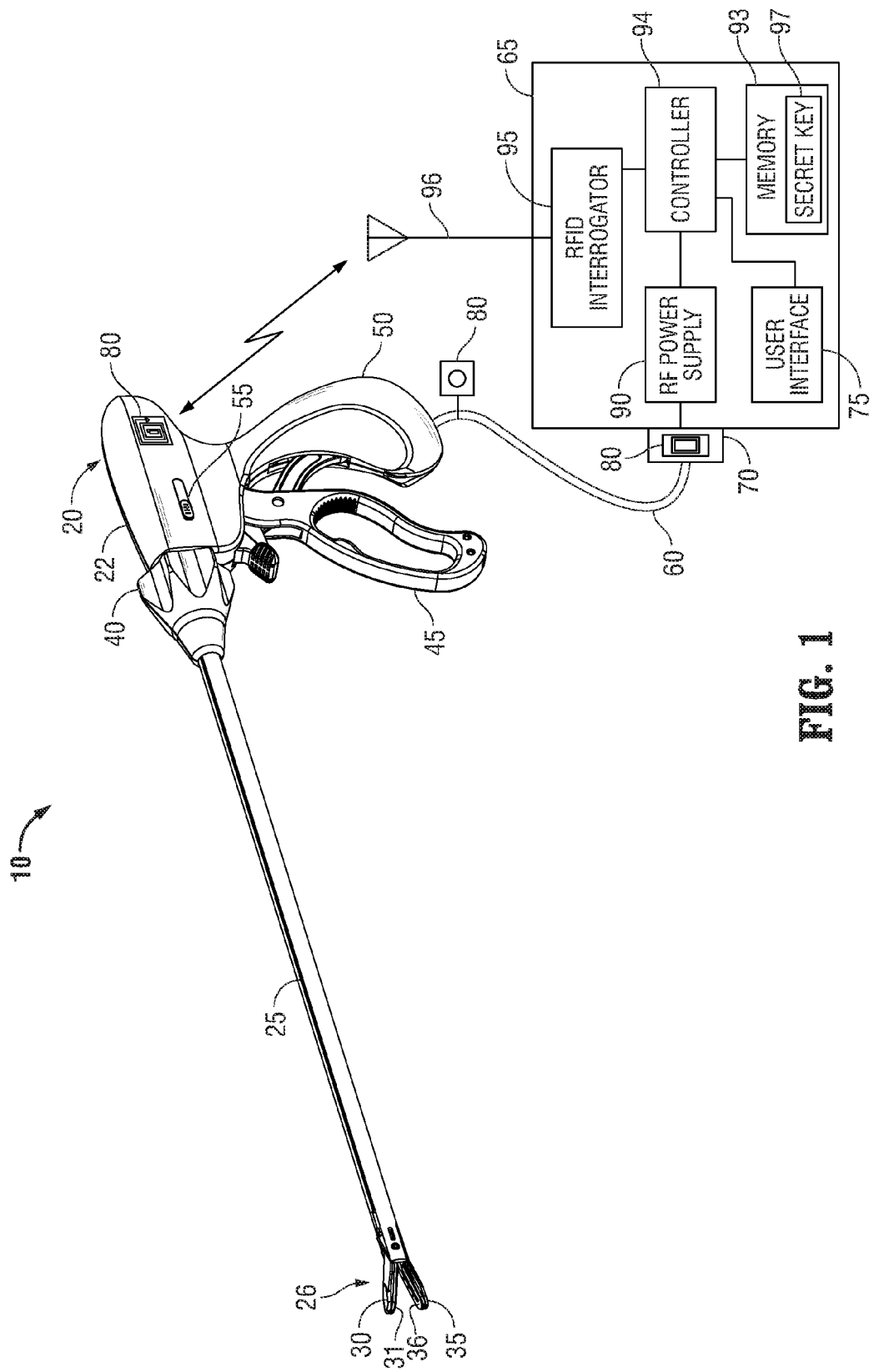
FIG. 1 is a schematic diagram of an embodiment of an RFID authentication system in accordance with the present disclosure.

Particular embodiments of the present disclosure are described hereinbelow with reference to the accompanying drawings; however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In the drawings and in the descriptions that follow, the term "proximal," as is traditional, shall refer to the end of the instrument that is closer to the user, while the term "distal" shall refer to the end that is farther from the user. In this description, as well as in the drawings, like-referenced numbers represent elements which may perform the same, similar, or equivalent functions.

With reference to FIG. 1, an embodiment of an electrosurgical system 10 in accordance with the present disclosure is presented. The system 10 includes an electrosurgical instrument 20 that is configured to operably couple with electrosurgical generator 65. Electrosurgical instrument 20 includes a housing 22 having a grip 50 extending therefrom and a handle 45 that is movable between a first position whereby handle 45 is positioned in spaced relation apart from grip 50 and a second position whereby handle 45 is positioned in spaced relation closer to grip 50 than in the first position. Electrosurgical instrument 20 includes RFID tag 80, which may be fixed to housing 22 in any suitable manner. Additionally or alternatively, RFID tag 80 may be fixed to a connector 70. In some embodiments, RFID tag 80 may be fixed to any mechanically associated portion of electrosurgical instrument 20 (e.g., shaft 25, grip 50, cable 60, and so forth). Preferably, RFID tag 80 is fixed to electrosurgical instrument 20 in a manner such that any attempted removal or physical disassociation of RFID tag 80 from electrosurgical instrument 20 will render RFID tag 80 and/or electrosurgical instrument 20 inoperative. A shaft 25 extends distally from housing 22 and includes at a distal end 26 thereof opposing jaw members 30, 35. Jaw members 30, 35 are moveable between an open position whereby jaw 30 is positioned in spaced relation apart from jaw 35 and a second position whereby jaw 30 is positioned in spaced relation closer to jaw 35 to grasp tissue therebetween.

To electrically control delivery of electrosurgical energy to jaw members 30, 35, the housing 22 supports a switch 55 thereon, which is operable by the user to initiate and terminate the delivery of electrosurgical energy to jaw members 30, 35. The switch 55 is in electrical communication with a source of electrosurgical energy such as electrosurgical generator 65 or a battery (not shown) supported within the housing 22. The generator 65 may include devices such as the LIGASURE® Vessel Sealing Generator and the FORCE TRIAD® Generator as sold by Covidien Energy-Based Devices of Boulder, Colo. A cable 60 extends between the housing 22 and the generator 65 and may include a connector 70 thereon such that the instrument 20 may be selectively coupled and decoupled electrically from the generator 65. In some embodiments, electrosurgical instrument 20 may include a vessel sealing instrument, such as, without limitation, an electrosurgical forceps such as that described in U.S. Pat. No. 7,255,697 to Dycus et al.

Instrument 20 may include a rotating control 40 that enables a user to rotate shaft 25 and/or jaw members 30, 35 around a longitudinal axis of the shaft 25 to position jaw members 30, 35 as necessary with respect to the surgical site without necessitating the twisting of housing 22, handle 50, etc. Generator 65 includes a user interface 75 configured to display operational data and provide audible tones to a user, and to accept user inputs.

The opposing jaw members 30, 35 are electrically coupled to cable 60, and thus to the generator 65, via conductors (not explicitly shown) that extend through the elongated shaft 25 to provide an electrical pathway to a pair of electrically conductive, tissue-engaging sealing plates 31, 36 disposed on the tissue-contacting faces of jaw members 30, 35, respectively. The sealing plate 31 of jaw member 30 opposes the sealing plate 36 of jaw member 35, and, in some embodiments, the sealing plates 31 and 36 are electrically coupled to opposite terminals, e.g., positive or active (+) and negative or return (−) terminals associated with the generator 65. Thus, bipolar energy may be provided through the sealing plates 31, 36. Alternatively, the sealing plates 31, 36 may be configured for delivering monopolar energy to the tissue. In a monopolar configuration, one or both sealing plates 31, 36 deliver electrosurgical energy from an active terminal, e.g. (+), while a return pad (not explicitly shown) is placed generally on a patient and provides a return path to the opposite terminal, e.g. (−), of the generator 65.

Generator 65 includes a controller 94 that is in operable communication with an RF source 90 that is configured to deliver electrosurgical energy to instrument 20. Controller 94 is in operable communication with RFID interrogator 95, and a memory 93. Memory 93 includes a copy of a secret key 97. In some embodiments, secret key 97 may be stored in memory 93 in encrypted or encoded form to hinder reverse-engineering and/or discovery of secret key 97 by an attacker. RFID interrogator 95 includes an antenna 96 that enables generator 65 to communicate effectively with RFID tag 80. Generator 65 includes a user interface 75 in operable communication with controller 94 that is configured to display operational data and provide audible tones to a user, and to accept user inputs.

RF source 90 is configured to selectively deliver electrosurgical energy in response to one or more control signals received from controller unit 94. Controller unit 94 is configured to receive user input signals from switch 55 and user interface 75 and is configured to receive authentication signals from RFID interrogator 95. Similar generators are described in commonly-owned U.S. Pat. Nos. 7,927,328 and 8,211,099, the entirety of each of which are incorporated by reference herein.

Figure 2:
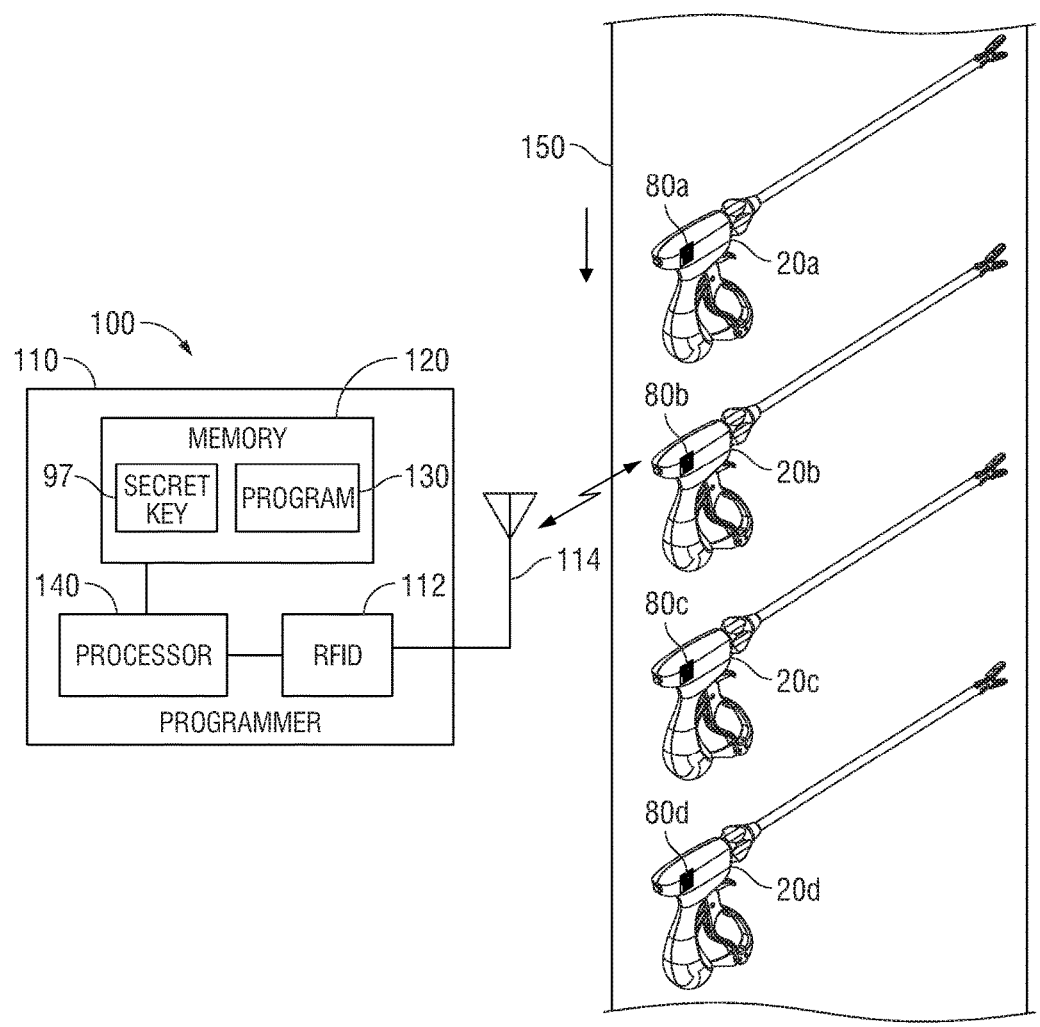
FIG. 2 is a schematic diagram of an RFID tag preparation process during manufacture of an electrosurgical instrument in accordance with the present disclosure.

The disclosed embodiments generate a cryptographically secure authentication signature from a unique UID 81 of RFID tag 80 and a secret key 97. Advantageously, the disclosed method enables a first device in possession of secret key 97 to process UID 81 of tag 80 to readily determine the authentication signature 82 for the instance of a second device, (e.g., instrument, accessory, or apparatus) associated with tag 80 and used in association with the first device, while making it extremely difficult or costly for an attacker to clone, counterfeit, or otherwise re-create the proper authentication signature. It is contemplated that the secret key 97 is stored in each device configured to perform authentication in accordance with the present disclosure. For example, the secret key 97 may be stored within memory 93 of generator 65, within RFID interrogator 95, as can be appreciated by the skilled artisan. The secret key 97 may be stored in a memory 120 of an RFID programmer 110 (FIG. 2). In some embodiments, the RFID tag 80 is compliant with the ISO 15693 RFID tag standard and therefore includes an absolutely (globally) unique 64-bit UID that is indelibly written during manufacture of the tag.

Figure 3:
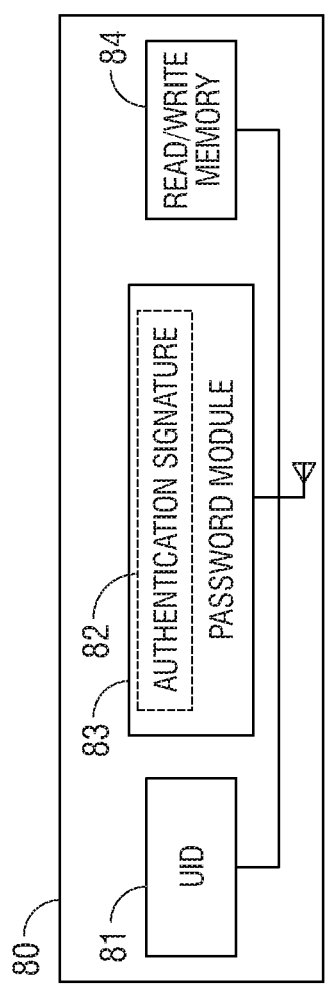
FIG. 3 is a block diagram of an RFID tag prepared in accordance with embodiments of the present disclosure.

With reference to FIGS. 2 and 3, a preparation procedure 100 of RFID tag 80 is presented wherein the tag's UID 81 read by programmer 110. In some embodiments, programmer 110 is operably associated with an assembly line 150 and is configured to sequentially program a plurality of instruments 20 (20a, 20b, . . . 20d) in mass production, combined with a secret key via an algorithm to derive a unique authentication signature. However, a programmer 110 may be utilized in other environments to prepare RFID tag 80 as required, such as, without limitation, a testing or repair facility.

Programmer 110 includes a processor 140 in operable communication with an RFID unit 112 and a memory unit 120, and optionally a user interface (not explicitly shown) to facilitate operation of programmer 110 by a user. Programmer 110 includes an RFID communication unit (e.g., a transceiver) in operable association with processor 140 that is configured to provide power to, and communicate with, RFID tag 80. Memory unit includes secret key 97, and program unit 130 that includes a set of programmable instructions for executing a method of preparing an RFID tag 80 as described herein.

RFID tag 80 includes a unique identification code (UID) 81, a password module 83 in operative communication with read-write memory 84, and which includes a write-only copy of authentication signature 82. Password module 83 includes the capability to control read and write access to read-write memory 84.

In some embodiments, a cryptographic (e.g., secure hash SHA-1 or secure-hash-based message authentication code SHA-1 HMAC) algorithm is utilized to generate authentication signature 82 from UID 81 and secret key 97. Advantageously, this approach ensures that authentication signature 82 will change if any bit of the UID 81 or secret key 97 changes. The generated authentication signature 82 is programmed into RFID tag 80 as the read, write, read-write, or other password within the password module 83. Note that use of the read, write, or read-write password or other password(s) allows unrestricted read access to UID 81, but may be utilized to restrict access to read-write memory 84. Therefore, once programmed, the password a.k.a. authentication signature 82 cannot be read from tag 80 because the authentication signature 82 is stored in password module 83 in a write-only mode. In use, password unit 83 of tag 80 will accept a proffered password, e.g., authentication signature, and in response, provide an indication (typically a status flag or status code) of whether the correct password (or an incorrect password) was received. Thus the disclosed method utilizes password unit 83 as a black box whereby the password is permanently concealed within, and can never read nor or transmitted from, RFID tag 80. In this manner, embodiments of the present disclosure achieve highly secure authentication without consuming any read-write memory of RFID tag 80.

Embodiments of the systems and methods described herein employ a preparation (e.g., manufacturing) phase and an authentication (e.g., field or end-user use) phase. In the preparation phase, one or more RFID tags are prepared with the authentication key. In the authentication phase, one or more of the prepared tags are authenticated for use. For example, a surgical instrument may include an RFID tag which undergoes preparation as described above. Prior to use, for example, when the instrument is received or inventoried at a facility (e.g., hospital), introduced into a surgical environment (e.g., brought into the operating room), and/or when the instrument is prepared for use (e.g., an electrosurgical instrument is attached to an electrosurgical generator), the RFID tag included in the instrument is authenticated to ensure it is suitable for use. A counterfeit or unsuitable instrument will fail authentication, the fact of which appropriate personnel will be notified and/or will render associated equipment inoperative (e.g., the generator will refuse to operate with the unauthenticated instrument).

To authenticate the RFID tag during use, an RFID reader reads the UID from the tag. The RFID reader then re-generates the authentication key from the secret key known to the RFID reader and the UID just read from the tag using the same algorithm used to prepare the tag. The resulting authentication signature is proffered to the RFID key as a read, write, or read-write or other password(s). If the RFID tag returns a successful status, e.g., the correct password was entered, the RFID tag, and hence, the device with which it is associated, is deemed genuine and use thereof permitted. Any other status, e.g., an unsuccessful status, indicates the tag and/or device are not genuine and appropriate action is taken, e.g., use of the device is prohibited or limited, a "kill" code may be issued to the device to render it permanently inoperable, an alarm may be issued, a message may be transmitted to an enforcement agency, and the like.

In some embodiments, additional data may be written to the RFID tag after authentication. For example, and without limitation, usage data including a usage count and a maximum number of uses may be maintained within the RFID tag's read-write memory. Therefore, even if a device is deemed genuine, if the device's usage counter exceeds an acceptable number, use of the device may be disallowed. Other types of data are envisioned, such as expiration date, calibration data, historical data, certification data, operational limits, a manufacturing date, a manufacturer serial number, and the like, that may be used in conjunction with the authorization systems and methods described herein to ensure proper use of various system devices.

Figure 4:
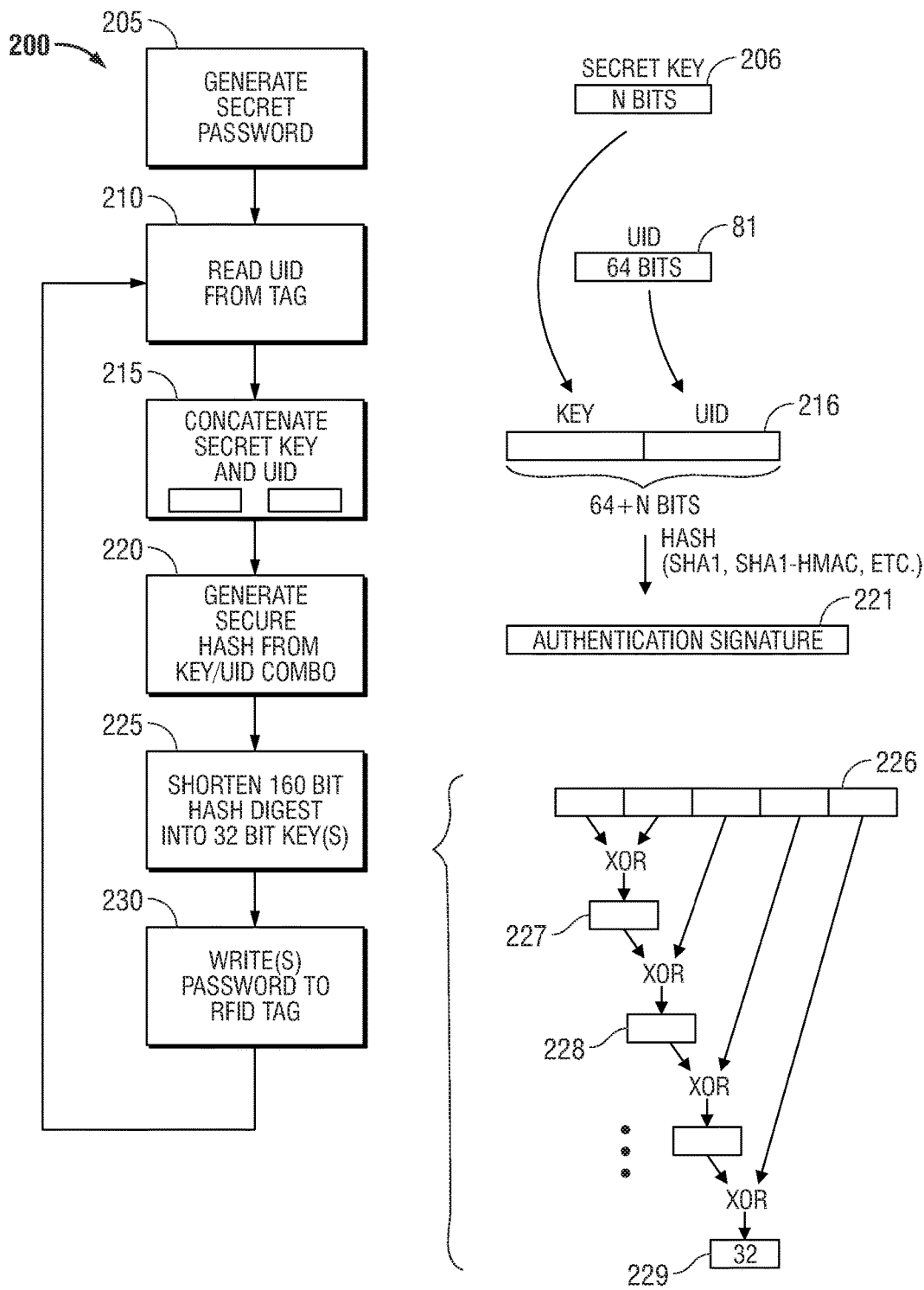
FIG. 4 is a flow diagram of an embodiment of an RFID preparation method in accordance with the present disclosure.

With reference to FIG. 4, an embodiment of an RFID secure authentication method 200 in accordance with the present disclosure is presented which generates a secure hash via an SHA-1 algorithm which produces a 160-bit message digest. In the present embodiment, the secret key is a bitstring 206 having a length of "n" bits. In step 205, the secret key is generated by any suitable means, including without limitation, manual entry, noise sampling, pseudo-random number generation, or any combination thereof. Secret key 206 is recorded in a secure and reliable manner as will be familiar to one of ordinary skill, and preferably with redundancy, since loss or compromise of the key would render all secure tags prepared with the key unsuitable for use.

In step 210, the programmer 110 reads UID 81 from RFID tag 80. In some embodiments, UID 81 is a bitstring having a length of 64 bits. In step 215 UID 81 is concatenated with the security key to create a resulting bitstring 216 having a length of n+64 bits. In step 220, an SHA-1 hash algorithm (e.g., in compliance with PIPS PUB 180-2 IETF RFC 3174) or SHA-1 HMAC message authentication algorithm (e.g., in compliance with PIPS PUB 198 IETF RFC 2104) is executed on the resulting n+64-bit bitstring yielding a 160-bit hash 221 (e.g., a hash digest). The hash 221 may be used directly as the authentication signature or, alternatively or optionally, the 160-bit hash digest may be shortened by dividing the hash digest into five groups of 32 bits each, performing a first XOR operation on the first two 32-bit groups to compute a first intermediate result 227, performing an XOR operation on the first intermediate result on the third group to compute a second intermediate result, and so forth in succession until a 32 bit final authorization signature 229 remains. In the step 230, the authorization signature (e.g., hash key 221, or 32 bit final authorization signature 229 is written to RFID tag 80 as a read, write, read-write, or other password, or some number of the 32-bit XOR results may be written to several RFID passwords.

Figure 5:
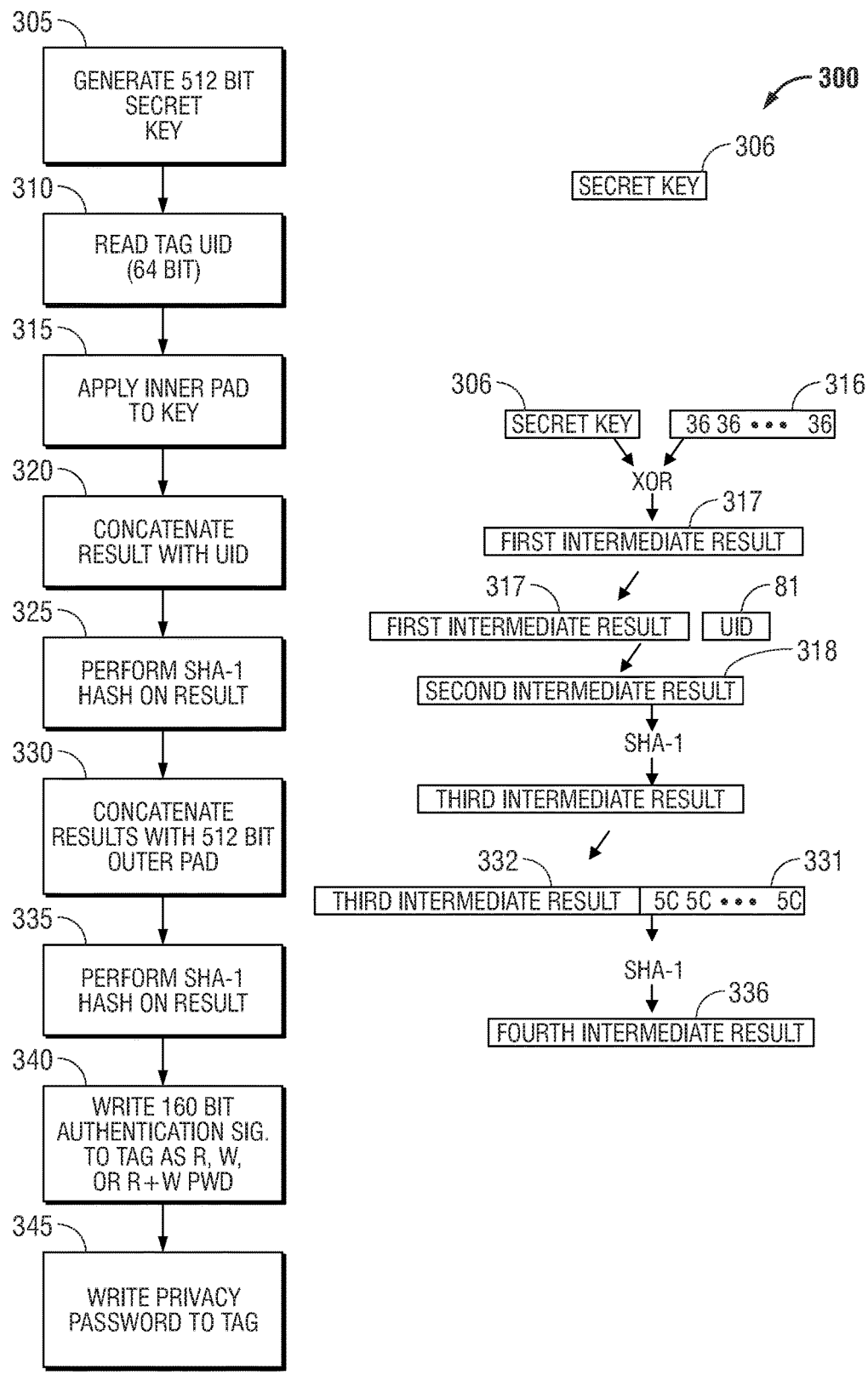
FIG. 5 is a flow diagram of another embodiment of an RFID preparation method in accordance with the present disclosure.

With reference now to FIG. 5, an embodiment of an RFID secure authentication method 300 in accordance with the present disclosure is presented which generates a final authentication signature via a hash-based message authentication code (HMAC). This embodiment may be appropriate in applications where increased cryptographic strength is required. HMAC is an encryption standard in accordance with IETF RFC 2104: FIPS PUB 198, and is essentially composed of two iterations of the SHA-1 hash algorithm (see above).

In step 305, a 512 bit secret key 306 is generated by any suitable means, including without limitation, manual entry, noise sampling, pseudorandom generation, or any combination thereof. Secret key 306 is recorded in a secure and reliable manner, and preferably with redundancy as described above. In some embodiments, secret key 306 may initially be less than 512 bits, and padded to achieve a final size of 512 bits using zeros or any other suitable bit pattern. In step 310, the UID 81 of the tag 80 undergoing preparation is read. In step 315, an XOR operation of the 512-bit secret key 306 and a 512-bit pad 316 consisting of the hexadecimal pattern 3636 . . . 36 (a.k.a. an "inner pad" bit pattern) is performed to obtain a first intermediate result 317. In step 320, first intermediate result 317 is concatenated with the 64-bit UID 311 to obtain a second intermediate result 318. In step 325 an SHA-1 operation is performed on second intermediate result 318 to obtain a third intermediate result 326 including a 160 bit hash. In step 330, third intermediate result 326 is concatenated with a 512-bit pad 331 consisting of the hexadecimal pattern 5C5C . . . 5C (a.k.a. an "outer pad" bit pattern) to yield a fourth intermediate result 332, and in step 335, an SHA-1 operation is performed on fourth intermediate result 332 yielding a 160-bit authentication signature 336. In the step 340, the authorization signature 336 is written to RFID key 80 as a read, write, read-write, or other password. The authentication signature cannot be used as the privacy password, as the UID cannot be read when in privacy mode.

Typically, an unprepared (e.g., factory-fresh or "virgin") RFID tag will contain a default or null password, or possibly a manufacturer-provided "transport password". A tag may include the capability to recognize separate and distinct passwords, for example, a password that enables reading only ("read" password"), a password that enables writing only ("write password"), and a password that enables reading and writing ("read-write password"), or other password(s).

The UID of the tag is read, e.g., by an RFID interrogator, and the UID used to calculate an RFID signature described in detail below. To change a default or existing read password to a new read password, the existing read password is written to the tag with a "set read password" command to unlock the RFID tag, then, the new password is written to the chip in conjunction with a "write read password" command. Additionally or alternatively, to change a default or existing write password to a new write password, the existing write password is written to the tag in conjunction with a "set write password" command, which, in turn, enables the new write password to be written to the chip via a "write write password" command.

The authentication signature is written to a secure area of RFID memory that is commonly used to store a read or write password, and which is not part of read-write memory. Advantageously, the actual password memory area of an RFID tag is never accessible (readable) by any user. Only the fact that a correct (or incorrect) password has been supplied is revealed by the RFID tag. Therefore, because the password, being dependent upon the UID and the secret key, is unique to an individual RFID chip, a brute force attack to guess the password will, in the worst-case scenario, result in access to only that single device. Since all other devices within the system population will have different authentication signatures, a compromise of a single tag will not result in a compromise of any other tag in the system.

In some embodiments, the 32 bit read and write passwords may be combined to create a single 64 bit password that provides enhanced security. In some embodiments, the RFID tag includes a parameter that indicates that the length of both the read and the write password is 64 bits, which, in turn, is defined by the concatenated 32 bit read password and 32 bit write password.

If it is required to further secure the RFID tag from attack, a privacy password may be utilized whereby the entire contents (including UID) of the RFID tag is rendered invisible unless the correct privacy password is provided. Once in privacy mode, the correct privacy password must be provided to the RFID tag before any data can be read to or written from the tag. An RFID tag may be placed into privacy mode whereby the correct privacy password must be provided to the tag before any data can be read from the tag, including the tag's UID. In this instance, an additional layer of security is achieved which further resists unauthorized attempts to read or modify the contents of the RFID tag. It should be noted that the privacy password should be consistent across the targeted population of tags (and devices associated therewith), because the UID is unavailable until the privacy password is provided which precludes the use of a unique "privacy authorization key" based upon the UID.

Once an RFID tag is in privacy mode, the tag will respond only to a "get random number" command and to a "set (privacy) password" command issued in sequence. The "get random number" command causes the RFID tag to generate and transmit a 16 bit random number to the interrogator. The 16 bit random number is repeated twice to generate a 32 bit number, which is then XORed with the 32 bit privacy password. In this manner, the actual password is not transmitted over the air, and thus, its vulnerable to interception is greatly reduced. The tag, which is in possession of the random number used to encode the password, may then reconstruct the actual privacy password. Having received the "set password" command, the tag then changes from "privacy" to "public" mode. Once in "public" mode, the RFID chip may then be accessed normally, e.g., in read or write mode, according to the status of the read or write passwords.

Figure 6:
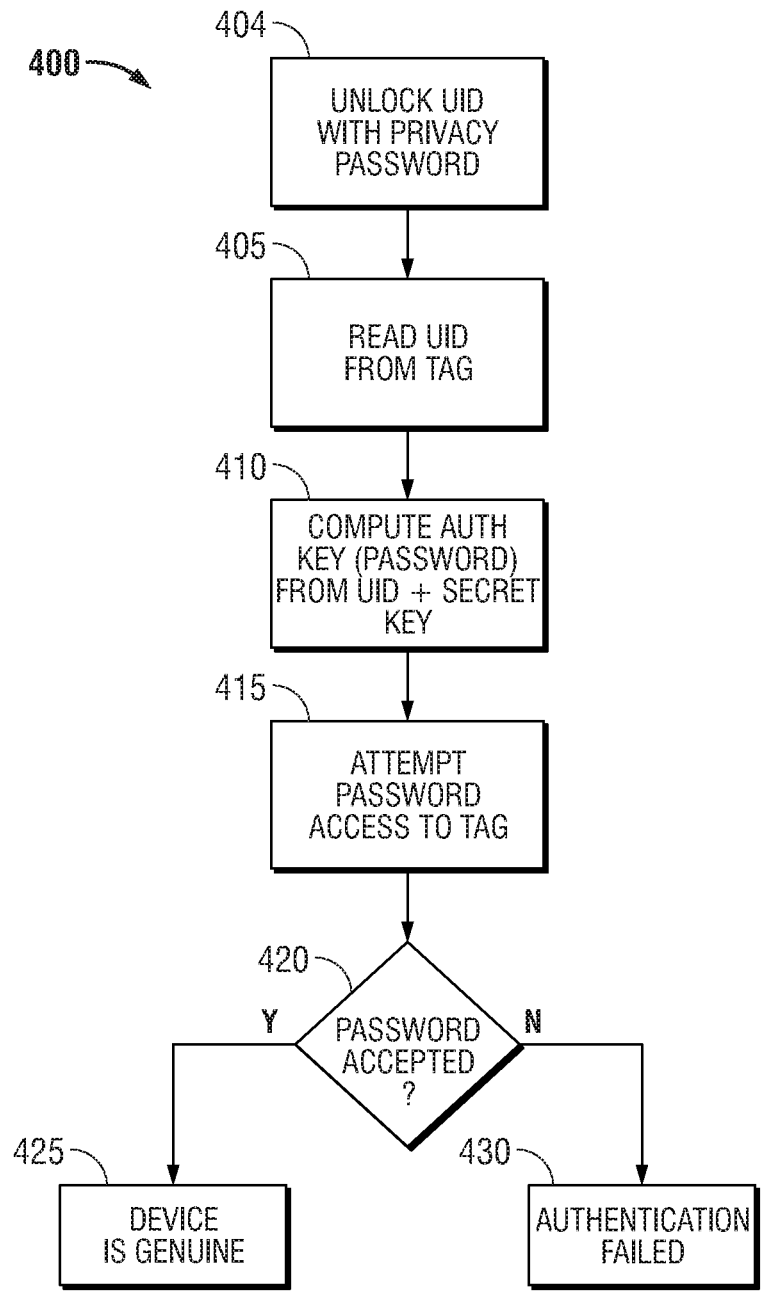
FIG. 6 is a flow diagram of an embodiment of an RFID authentication method in accordance with the present disclosure.

Turning now to FIG. 6, an embodiment of an authentication method 400 of a device associated with an RFID tag prepared as described herein is presented. In the step 404, a privacy password, if required, is written to the tag to unlock the UID. In embodiments, the privacy password is written by an RFID reader or interrogator. In the step 405, the UID is read from the tag and, in the step 410, the authorization signature is computed from the UID just read and the secret key, as described hereinabove. In the step 415, the authorization signature is transmitted to the RFID tag as a read, write, read-write, or other password in an attempt to access read-write memory of the RFID tag and/or attempt to verify authenticity of the instrument 20. In the step 420, the password is processed by the RFID tag and a result is communicated to the reader/interrogator. If the authentication signature a.k.a. password is accepted by the tag, then in the step 425 the tag and/or a device therewith is deemed genuine. Conversely, if the authentication signature/password is not accepted, than in the step 430 an authorization failure is indicated.

It will be understood that various modifications may be made to the embodiments disclosed herein. Further variations of the above-disclosed and other features and functions, or alternatives thereof, may be desirably combined into many other different systems, instruments and applications. Although example embodiments are presented which utilize the SHA-1 or SHA-1 HMAC cryptographic algorithms, it is to be understood that embodiments of the present disclosure may be practiced utilizing any suitable cryptographically-secure signature algorithm, including without limitation SHA-2, MD5, GOST, RIPEMD and/or SNEFRU. Thus, various presently unforeseen or unanticipated alternatives, modifications, variations or improvements therein may be subsequently made by those skilled in the art, which are also intended to be encompassed by the following claims.

What is claimed is:

1. A method of authenticating an RFID tag, the method comprising:
    encrypting a secret key stored on a first device with a unique identification code stored on an RFID tag to generate an original authentication signature at the first device;
    storing the original authentication signature at the RFID tag;

reading the unique identification code from the RFID tag using a second device;
encrypting a copy of the secret key stored on the second device with the unique identification code to generate a second authentication signature at the second device;
comparing the second authentication signature to the original authentication signature; and
determining authenticity of the RFID tag based on the comparison of the second authentication signature and the original authentication signature.

2. The method according to claim 1, wherein the original authentication signature and the second authentication signature are generated by performing a hash function on the secret key stored at the first device or the copy of the secret key stored at the second device, respectively, and the unique identification code.

3. The method according to claim 2, wherein the hash function is selected from the group consisting of an SHA-1 function, an SHA-1 HMAC function, an SHA-2 function, and an MD5 function.

4. The method according to claim 1, wherein the original authentication signature and the second authentication signature are generated by:
concatenating the unique identification code and the secret key stored at the first device or the copy of the secret key stored at the second device to create a bitstring; and
performing a hash function on the bitstring.

5. The method according to claim 4, wherein the hash function is selected from the group consisting of an SHA-1 function, an SHA-1 HMAC function, an SHA-2 function, and an MD5 function.

6. The method according to claim 1, further comprising:
dividing the original authentication signature into a plurality of bitstrings; and
performing an XOR operation on a first bitstring of the plurality of bitstrings and on a second bitstring of the plurality of bitstrings to obtain an intermediate signature.

7. The method according to claim 6, further comprising: performing an XOR operation on the intermediate signature and on a third bitstring of the plurality of bitstrings.

8. The method according to claim 1, wherein determining authenticity of the RFID tag further includes performing at least one of a read function, a write function, or a read-write function on the RFID tag by the second device.

9. A system for authenticating an RFID tag, comprising:
an RFID tag including:
a unique identifier; and
a password module configured to store a password; and
a preparation unit including:
an RFID communication module configured to communicate with the RFID tag;
a unit memory configured to store a secret key;
a processor coupled to the unit memory and the RFID communication module, the processor configured to:
read the unique identifier from the RFID tag;
encrypt the secret key with the unique identifier of the RFID tag to generate an authentication signature; and
store the authentication signature as the password in the password module.

10. The system according to claim 9, wherein the password module is configured to output a verification status in response to a match between a proffered password and the stored password.

11. The system according to claim 10, wherein the RFID tag further includes a tag memory for storing data.

12. The system according to claim 11, wherein the password module is configured to enable at least one of a read operation or a write operation on the tag memory in response to a match between a proffered password and the stored password.

13. The system according to claim 12, wherein the password module is configured to initialize a data structure in response to a match between a proffered password and the stored password.

14. The system according to claim 13, wherein the data structure is configured to store one or more datum selected from the group consisting of a usage count, a manufacturing date, a manufacturer serial number, an expiration date, calibration data, usage data, certification data, and an operational limit parameter.

15. The system according to claim 9, wherein the processor is further configured to generate the authentication signature based on a cryptographic hash of the secret key and the unique identifier of the RFID tag.

16. The system according to claim 15, wherein the cryptographic hash is selected from the group consisting of an MD5 hash, an SHA-1 hash, an SHA-1 HMAC function, and an SHA-2 hash.

17. A system for authenticating a surgical instrument, the method system comprising:
a surgical instrument having an RFID tag, wherein the RFID tag includes:
a unique identifier; and
a password module configured to store a password; and
an authentication unit, including:
an RFID communication module configured to communicate with the RFID tag;
a unit memory configured to store a secret key;
a processor coupled to the unit memory and the RFID communication module, the processor configured to:
read the unique identifier from the RFID tag;
encrypt the secret key with the unique identifier of the RFID tag to generate an authentication signature;
transmit the authentication signature to the password module; and
receive a verification status from the password module in response to the authentication signature matching the password.

18. The system according to claim 17, further comprising an electrosurgical generator operably coupled to the authentication unit.

19. The system according to claim 18, wherein the electrosurgical generator is configured to enable an operational mode in response to the verification status.

20. The system according to claim 19, wherein the RFID tag further includes a tag memory storing data and the authentication unit is configured to modify the data stored in the tag memory.

* * * * *